R. SCHMIDT.
CORN HUSKING MACHINE.
APPLICATION FILED MAR. 7, 1913.
1,145,037.
Patented July 6, 1915.
2 SHEETS—SHEET 1.
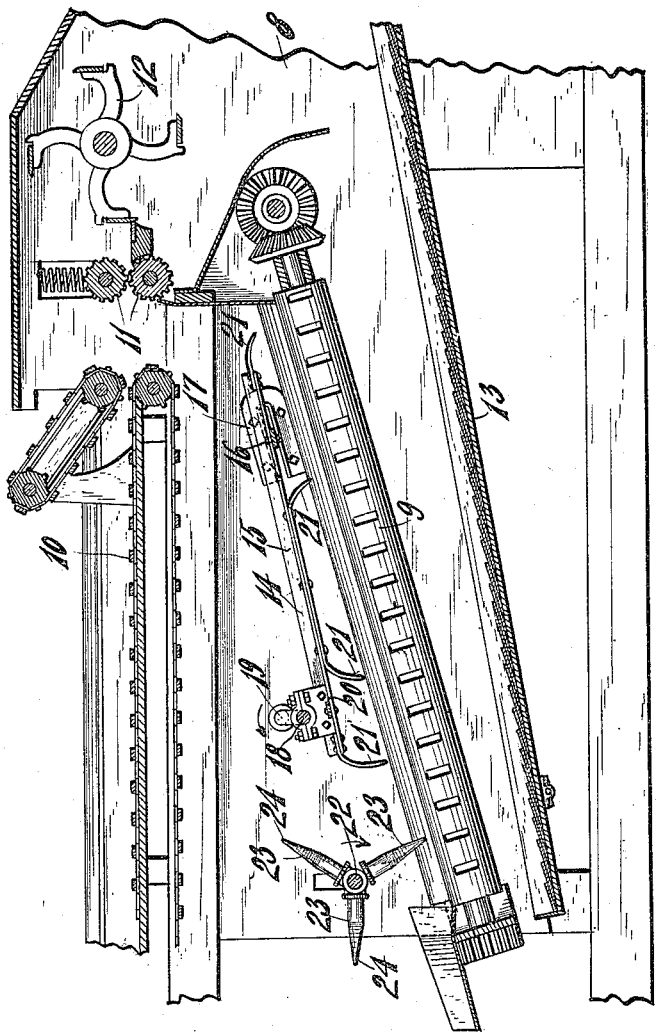

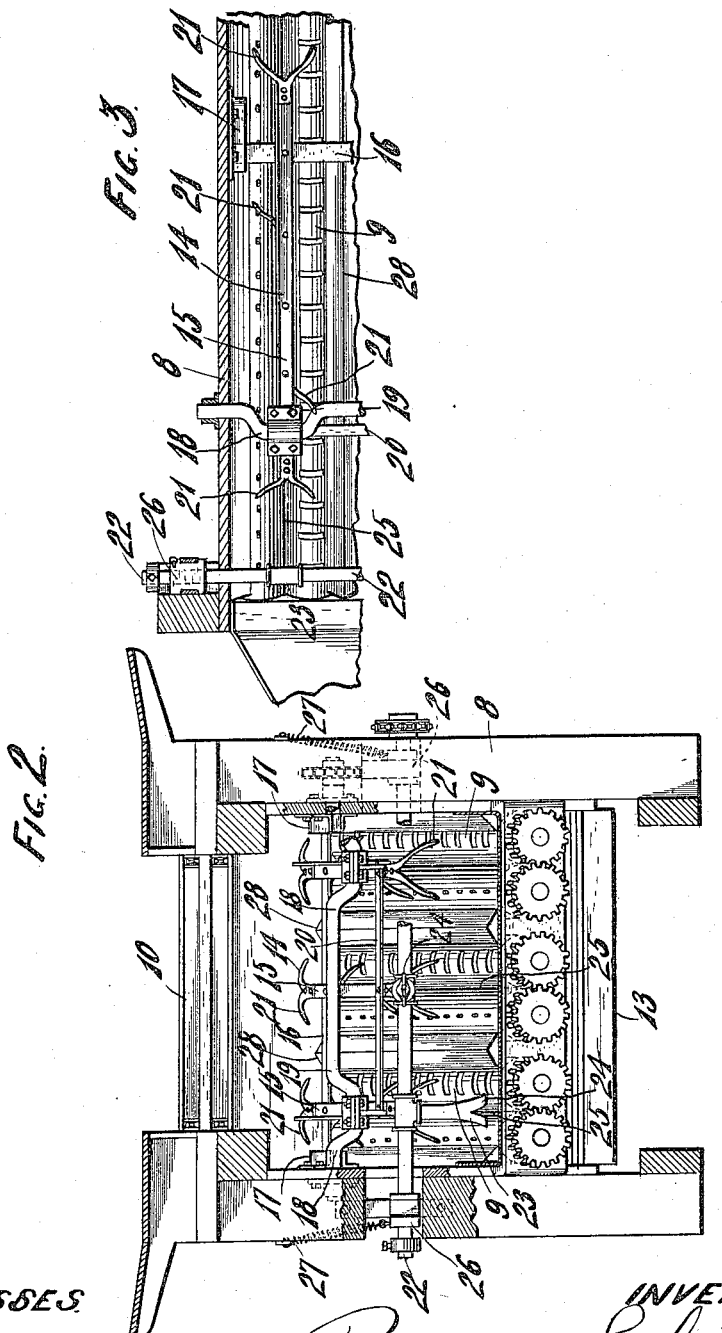

UNITED STATES PATENT OFFICE.

REIMAR SCHMIDT, OF APPLETON, WISCONSIN, ASSIGNOR TO DOUBLE POWER MILL COMPANY, OF APPLETON, WISCONSIN, A CORPORATION OF WISCONSIN.

CORN-HUSKING MACHINE.

1,145,037.   Specification of Letters Patent.   Patented July 6, 1915.

Application filed March 7, 1913. Serial No. 752,540.

*To all whom it may concern:*

Be it known that I, REIMAR SCHMIDT, a citizen of the United States, and resident of Appleton, in the county of Outagamie and State of Wisconsin, have invented new and useful Improvements in Corn-Husking Machines, of which the following is a description, reference being had to the accompanying drawings, which are a part of this specification.

This invention relates to improvements in corn husking machines of that type provided with inclined husking rolls upon which the ears of corn slide or work downwardly while being husked.

It is one of the objects of this invention to provide a corn husking machine with an advancing means for distributing the ears of corn to the husking rolls and for kicking out the upper ears which are not in position to be acted upon by the said rolls in an efficient manner and which tend to clog the machine.

A further object of the invention is to provide a corn husking machine with an advancing means which will yield under abnormal strain to prevent injury to the parts due to the husking machine becoming clogged from overfeed or other causes.

A further object of the invention is to provide a corn husking machine with means for distributing the corn to all of the husking rolls before it reaches the advancing means.

With the above and other objects in view, the invention consists of the improved corn husking machine and its parts and combinations as set forth in the claims, and all equivalents thereof.

In the accompanying drawings in which the same reference characters indicate the same parts in all of the views: Figure 1 is a fragmentary longitudinal sectional view of the improved corn husking machine; Fig. 2 is an end view thereof, parts being broken away and other parts shown in section; Fig. 3 is a detail horizontal sectional view of one side portion of the corn husking machine.

Referring to the drawings the numeral 8 indicates the frame or casing of the improved corn husking machine, 9 the husking rolls mounted therein, 10 the endless belt feeding mechanism mounted thereabove, 11 the ear snapping rolls, 12 the cutter also mounted within the casing and 13 the vibratory inclined pan for elevating the husked material. The feeding mechanism is adapted to feed the corn stalk to the snapping rolls and to the cutter, and the snapping rolls in engaging the stalks will snap off the ears of corn and the ears will fall onto the husking rolls and be engaged thereby. The ears of corn in falling from the snapping rolls will be engaged by an ear distributer 14 which serves to distribute the ears evenly over the husking rolls and to hold back the surplus ears fed to the rolls until the rolls have husked the ears directly in contact with said rolls. The distributer comprises a series of bars 15 which are connected at their upper ends to a transverse member 16 slidably mounted in slideways 17 secured to opposite sides of the frame or casing 8. The lower rear ends of the two outer bars 15 are journaled on the cranked portions 18 of the cranked shaft 19 extending transversely of the frame, and the lower end of the intermediate bar 15 is connected to a transverse bar 20 carried by the lower ends of the outer bars. The bars are positioned above the adjacent peripheries of each pair of rolls and extend longitudinally with relation thereto and are provided with curved depending fingers 21 which engage the unhusked ears of corn and distribute them evenly to the different pairs of rolls. The bars are given an oscillating motion by means of the combined cranked and sliding connection and serve to push back and aline the ears with the rolls so they will be properly engaged thereby.

A transverse advancing shaft 22 positioned above the lower end portions of the husking rolls is provided with a plurality of radial advancing fingers 23 having bifurcated ends 24 which rotate in a plane immediately above the adjacent peripheries of the rollers of the pairs of rolls. The bifurcated end portions are of sufficient width to permit ears of corn to pass therethrough when the said ears are sliding down the rolls and in the spaces or channels 25 formed between the pairs of rolls. In the event of an excess feed of corn in which the ears will be piled on top of one another the advancing fingers will kick the upper unhusked ears out of the machine and only permit the ears properly positioned to pass by that are engaged and husked by the husking rolls.

The advancing shaft 22 is journaled in boxes 26 which have a sliding connection with the frame and are held yieldingly in position by means of coiled springs 27 connected at their lower ends to the boxes and at their upper ends to the frame. This yielding connection provides for the pushing forward of cobs of corn out of the machine when the machine is loaded to such an extent that the husking rolls cannot take care of the ears of corn fed thereto. In yielding upwardly the corn on the ear is not shelled as would be otherwise, and the machine is relieved of any undue strain as the excess feed can freely pass out of the machine without doing any damage.

The spaces between the pairs of rolls are covered by angled members 28 which serve to direct the ears of corn to the spaces formed between the rolls of the pairs of rolls.

From the foregoing description it will be seen that the corn husking machine is very simple in construction and is well adapted to perform the functions desired.

What I claim as my invention is:

1. In a corn husker, the combination of a casing having a plurality of pairs of husking rolls mounted therein, bearings slidably and yieldingly mounted in the sides of the casing and a rotary advancing member journaled in said bearings and extending transversely across and above the husking rolls.

2. In a corn husker, the combination of a casing having a plurality of pairs of husking rolls mounted therein, an oscillatory distributing member mounted above the husking rolls and co-acting therewith, and an advancing member mounted yieldingly and transversely above the husking rolls and moving in a direction to advance material on the rolls and in the path of flow of material acted upon by the distributing member, said advancing member provided with radial fingers having bifurcated ends which rotate in a plane above the adjacent peripheries of rolls of each pair of rolls.

3. In a corn husker, the combination of a casing having a plurality of pairs of husking rolls mounted therein, an oscillatory distributing member mounted above the husking rolls and co-acting therewith, said distributing member having a sliding movement at its upper end and a rotary movement at its lower end, bearings slidably mounted in the opposite sides of the casing, an advancing member journaled in said bearings and extending transversely across and above the husking rolls and moving in a direction to advance material on the rolls and in the path of material acted upon by the distributing member, said advancing member provided with radial fingers having bifurcated ends which rotate in a plane above the adjacent peripheries of rolls of each pair of rolls, and coiled springs connected to bearings and to the casing to yieldingly support the retarding member.

4. In a corn husker, the combination of a casing having a plurality of pairs of husking rolls mounted therein, an oscillatory distributing member mounted above the husking rolls and coacting therewith, and an advancing member yieldingly mounted above the husking rolls and moving in a direction to advance material on the rolls.

5. In a corn husker, the combination of a casing having a plurality of husking rolls mounted therein, an oscillatory distributing member mounted above the husking rolls and coacting therewith, and a rotary advancing member mounted above the husking rolls adjacent said distributing member and coöperating with said member to advance material along the husking rolls and preventing congestion of the material upon said rolls.

6. In a corn husker, the combination of a casing having a plurality of pairs of husking rolls mounted therein, an oscillatory distributing member mounted above the husking rolls and coacting therewith, and a rotary advancing member slidably and yieldingly mounted above the husking rolls to advance material therealong.

In testimony whereof, I affix my signature, in presence of two witnesses.

REIMAR SCHMIDT.

Witnesses:
 RUBY BELDEN,
 IDA JOHNSON.

Copies of this patent may be obtained for five cents each, by addressing the "Commissioner of Patents, Washington, D. C."